United States Patent [19]

Box

[11] Patent Number: 4,835,130

[45] Date of Patent: May 30, 1989

[54] SELECTIVELY PERMEABLE ZEOLITE ADSORBENTS AND SEALANTS MADE THEREFROM

[75] Inventor: James A. Box, Broadview Heights, Ohio

[73] Assignee: Tremco Incorporated, Cleveland, Ohio

[21] Appl. No.: 146,043

[22] Filed: Jan. 20, 1988

Related U.S. Application Data

[62] Division of Ser. No. 919,503, Oct. 16, 1986, Pat. No. 4,745,711.

[51] Int. Cl.$^4$ .......................... B01J 20/18; B01J 20/20
[52] U.S. Cl. ...................... 502/62; 502/417; 52/172
[58] Field of Search .................. 502/62, 60, 417, 424; 52/172

[56] References Cited

U.S. PATENT DOCUMENTS

| | | | |
|---|---|---|---|
| 3,563,912 | 2/1971 | Young | 502/62 |
| 3,813,347 | 5/1974 | Hayes | 502/62 |
| 4,013,566 | 3/1977 | Taylor | 502/62 |
| 4,144,196 | 3/1979 | Schoofs | 502/64 |
| 4,386,012 | 5/1983 | Kulprathipanja et al. | 502/62 |
| 4,692,423 | 9/1987 | Caesar | 502/62 |

*Primary Examiner*—Carl F. Dees
*Attorney, Agent, or Firm*—Tarolli, Sundheim & Covell

[57] ABSTRACT

The invention relates to an improved adsorbent, essentially impermeable to oxygen and nitrogen but permeable to water vapor, and to sealants incorporating said adsorbent. The adsorbent comprises outgassed zeolite having pores with apertures large enough to permit entry of gases such as oxygen and nitrogen into the pore spaces and having on its surface, covering the pore apertures, a fluid which is essentially impermeable to nitrogen and oxygen molecules and yet permeable to water vapor. The zeolite adsorbent, and sealants prepared from the zeolite, are particularly useful in the fabrication of thermal insulating glazed windows having a sealed air pocket.

15 Claims, 1 Drawing Sheet

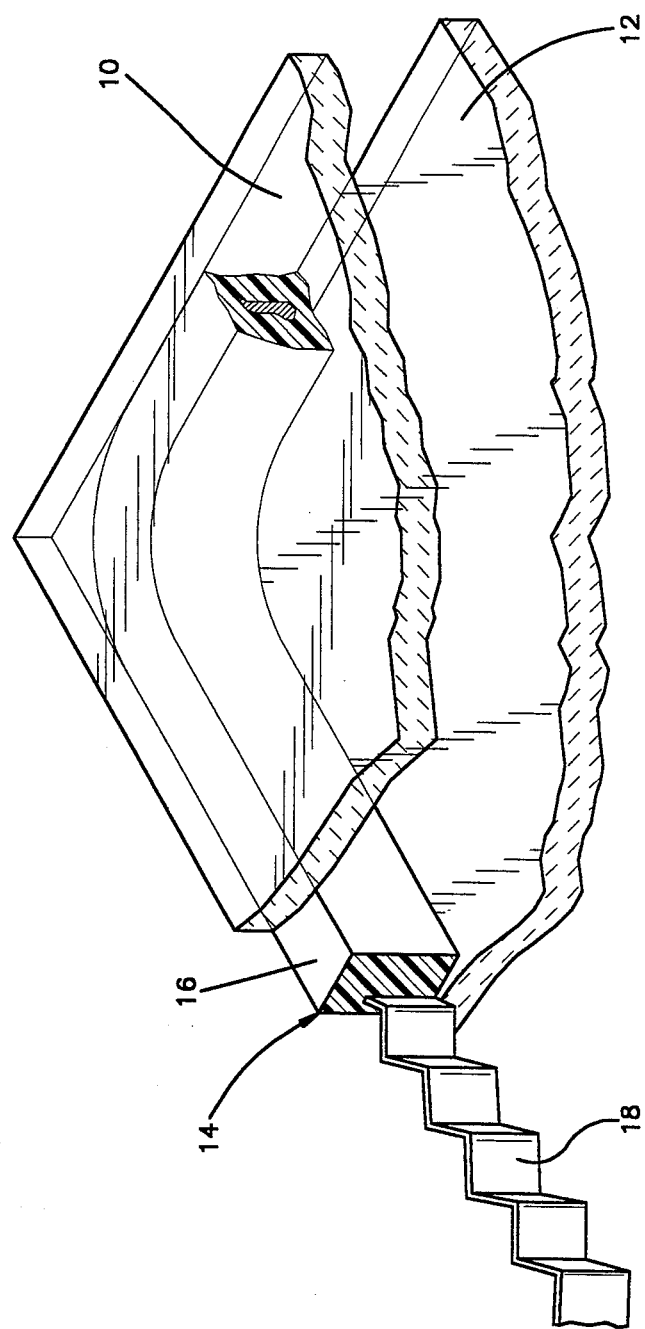

SELECTIVELY PERMEABLE ZEOLITE ADSORBENTS AND SEALANTS MADE THEREFROM

This application is a division of copending Application Ser. No. 919,503, filed Oct. 16, 1986 now U.S. Pat. No. 4,745,711.

The present invention relates to an improved zeolite adsorbent. The present invention also relates to sealants incorporating the improved zeolite adsorbent. Such sealants have varied uses, one of which is in the fabrication of thermally insulating multiple glazed structures such as insulated glass.

BACKGROUND OF THE INVENTION

Zeolites are well known adsorbents, which have been used between glass panes, either alone or in a sealant. The zeolite is disposed along the periphery of the space enclosed by the panes, and the zeolite adsorbs water vapor from the space between the panes. Zeolite functions as a "molecular sieve". Specifically, zeolite has pores into which the material being adsorbed passes. The pores have apertures of a size sufficient to pass the molecules of the material being adsorbed but small enough to block materials not adsorbed. U.S. Pat. Nos. 4,151,690, 4,141,186 and 4,144,196 disclose such molecular sieve zeolites.

Known zeolites have pore aperture sizes of 3 to 10 angstroms. However, zeolites with aperture sizes 4 angstroms or greater, when used in an insulating window, adsorb gaseous components in the air space, such as oxygen and nitrogen, as well as the water vapor which is desired to be adsorbed. These zeolites then outgas the oxygen and nitrogen when the temperature rises or the pressure lowers. These zeolites, when used in a sealant between glass panes in a window, adsorb the oxygen and nitrogen when cooled (as during night) and then release the gases when the glass is heated (as during the day). This causes large pressure variations in the enclosed air space, which can lead to problems with the windows such as excessive deflection or inflection. This outgassing can also lead to a loss of adhesion between the glass panes and the sealant because agglomeration of the gases permits small bubbles to form which migrate to the adhesive interface.

U.S. Pat. Nos. 4,144,186 and 4,144,196 attempt to solve this problem by using zeolite adsorbents with pore apertures of 3 angstroms or less in size so that oxygen and nitrogen molecules cannot enter into the pores, thus preventing the adsorption and the desorption of these gases. U.S. Pat. No. 4,151,690 contemplates the use of zeolite adsorbents with larger pore aperture sizes, which have been pretreated by preadsorption of a low molecular weight polar material to partially suppress the undesirable adsorption of the gases.

BRIEF SUMMARY OF THE INVENTION

An object of the present invention is to provide a molecular sieve zeolite adsorbent which has pore apertures of 4 angstroms or greater in size and which is free of the problems associated with the constant adsorption and desorption of gases. This is effected by heating the zeolite to drive out (or "outgas") the nitrogen and oxygen in its pores, and allowing it to cool while surrounded and covered by a fluid coating which is essentially impermeable to oxygen and nitrogen yet permits water vapor to slowly pass therethrough into the pores of the zeolite. Thus, the coated zeolite has a greater capacity to adsorb water vapor, which is desired, but does not adsorb any significant amount of oxygen or nitrogen. Outgassing the zeolite also places less nitrogen and oxygen into the system where the zeolite is being used as an adsorbent.

The molecular sieve zeolite is in a particulate form. The particles have a plurality of pores throughout, some pores being adjacent the surface. The pores adjacent the surface have apertures at the surface large enough to permit entry of oxygen and nitrogen molecules as well as molecules of water vapor. The fluid coating on the surface of the zeolite extends over and covers the pore apertures, but does not penetrate the pores. The coating may be any fluid which will coat the zeolite particles without being adsorbed into the pores, which is relatively permeable to water vapor, and which is essentially impermeable to nitrogen and oxygen (has a low solubility). The fluid provides a barrier blocking the entry of oxygen and nitrogen into the pores. However, any water vapor which comes in contact with the fluid, solvates in the fluid and is transmitted through the fluid, into the pores of the zeolite, at a slow transmission rate. The zeolite with the fluid coating in accordance with the present invention may be used as a part of a sealant composition which is used between the glass panels of a double glazed window.

The sealant is made by first mixing the molecular sieve zeolite particles with the fluid which may preferably be paraffinic oil. Approximately equal parts by weight of zeolite powder and oil are mixed together to form a slurry. The percentage of oil must be high enough so that the oil is the continuous phase. The slurry is slowly heated under mild agitation and is kept heated for a sufficient time to outgas most of the oxygen and nitrogen that may have been trapped in the pores of the zeolite. The material is then cooled to room temperature. The fluid at room temperature is essentially impermeable to nitrogen and oxygen and prevents nitrogen and oxygen from reentering the pores of the zeolite.

Thereafter the zeolite particles with the coating thereon are mixed with other components of a sealant material, and the resulting material is then extruded to form the desired sealant.

BRIEF DESCRIPTION OF THE DRAWING

Further features and advantages of the present invention will be apparent to those skilled in the art to which it relates from a consideration of the following description of a preferred embodiment of the present invention made with reference to the accompanying drawing in which the FIGURE is a fragmentary perspective view with parts in section showing a sealant embodying the present invention.

DETAILED DESCRIPTION OF THE INVENTION

The present invention relates to a zeolite adsorbent and sealants prepared therefrom useful for various purposes and especially useful for structural sealants used in the fabrication of thermal insulating multiple glazed windows.

Zeolite is a known material which has the characteristic of being an excellent adsorbent. Zeolite is available commercially from various companies, including Union Carbide, W.R. Grace Company, and others. The zeolite as used in the present invention is in a particle form, of a mesh size of less than 100. The zeolite particles have a large number of pores on the surface and throughout the mass of the zeolite. The pores are of a given diameter, slightly below the surface of the zeolite, with a smaller pore aperture extending through the surface. Zeolite which is usable for dessicating insulating glass units is available with pore aperture sizes ranging from 3 angstroms to 10 angstroms.

When zeolite is used as an adsorbent, it functions by drawing molecules of whatever material is to be adsorbed, such as gas or water vapor, through the apertures of the pores and into the pores themselves, where the molecules are retained. Although the interaction of the zeolite with the gas and vapor molecules is not fully understood, it is believed that there is an electrical charge on the zeolite material, and a charge of opposite polarity on the molecules of the material being adsorbed, thus causing an attraction of the molecules into the pores of the zeolite.

Because zeolite can be used as an adsorbent for different types of materials, and these materials may have molecules of different sizes, the particular zeolite to be used in any particular application must have pore apertures of a size large enough to permit passage of the molecules of the particular material to be adsorbed.

One known use for zeolite adsorbents is to function as a desiccant to draw water vapor out of the air space between two panes of glass in a double glazed window. In this case, the zeolite must have pore apertures large enough to admit molecules of water vapor. As discussed above, however, it is desirable that the zeolite not adsorb molecules of nitrogen and oxygen, the main gaseous components of air, from the air enclosed within the double glazed window. Zeolites having pore apertures of 4 angstroms or greater in size will not exclude molecules of nitrogen and oxygen.

In order to provide a zeolite adsorbent which functions as thus desired, the present invention contemplates the use of zeolite which, although it has pore apertures which are 4 angstroms or greater in size and thus are large enough to admit nitrogen and oxygen molecules, will not do so because there is a layer of gas impermeable fluid on the zeolite, extending across and covering the pore apertures on the surface of the zeolite. The fluid is, however, able to pass water vapor molecules. Therefore, the desired characteristics of both passage of water vapor and exclusion of nitrogen and oxygen are provided.

The fluid used in the present invention must have the following characteristics. First, it must be able to coat zeolite particles without being adsorbed into the pores when properly mixed with the zeolite material. Second, it must be permeable to water vapor, preferably at a very low rate. Third, it must be essentially impermeable to nitrogen and oxygen, which are the main gaseous components of air. Many fluids may be useful in the present invention. These include paraffinic oils, naphthenic oils, and aromatic oils; phthalates such as butyl benzyl phthalate; polymeric polyesters such as Santicizer #278 from Monsanto; polybutene; rubber process oils; and silicone fluids.

One fluid which has been successfully used in preparing the improved zeolites of the present invention is Sun Par #2280, a refined petroleum product available from Sun Oil Co. This oil has a composition of 73% paraffinic carbon atoms, 23% naphthenic carbon atoms, and 4% aromatic carbon atoms.

Although it will be appreciated that various methods of preparing the zeolite of the present invention are feasible, the following is illustrative of the preparation of the zeolite having the ability to adsorb moisture while not adsorbing nitrogen, oxygen and other gases.

A 4-angstrom molecular sieve zeolite (95 parts by weight) and a 10-angstrom molecular sieve zeolite (95 parts by weight) were combined with 206 parts by weight of Sun Par #2280 and mixed for five minutes to insure a uniform slurry or dispersion of the ingredients. The percentage of zeolite used must be low enough so that the fluid is the continuous phase. Any lesser amount of zeolite may be used if desired. The slurry was slowly heated for about 15 minutes to a temperature of about 325° F. under mild agitation. The mixture was maintained at 325° F. for an additional 30 minutes and then cooled to room temperature. The heating can also be performed under a vacuum, in which case a lower temperature can be used and the same results obtained.

The heating causes oxygen and nitrogen to be outgassed or removed from the zeolite. When the slurry is cooled the oil prevents the oxygen and nitrogen from reentering the zeolite. During the heating process, some water vapor in the zeolite is also driven out, and no significant amount immediately reenters the zeolite because the pore apertures of the zeolite are covered with the layer of fluid which has a very slow moisture vapor transmission rate.

Although only one zeolite material may be used, it is often preferred to use a mixture of two or more zeolites. For example, equal parts by weight of a first zeolite having a pore aperture size of about 4 angstroms, and a second zeolite having a pore aperture size of about 10 angstroms, are used together. This use of two or more zeolites having different pore aperture sizes is sometimes preferred because there may be present some large diameter impurities such as low molecular weight polymer fractions, which can detract from the sealant's performance because of their volatility. These are adsorbed by large pore size molecular sieves.

In use, the zeolite adsorbent allows the controlled passage of water vapor. The water vapor penetrates or solvates in the fluid and passes through the fluid and into the zeolite pores. The nitrogen and oxygen, however, cannot significantly pass through the fluid and are thereby excluded from entering the zeolite pores. Thus, there is very little adsorption of gases into the coated zeolites.

As mentioned above, one preferred use of this improved zeolite adsorbent is in multipaned insulating windows. When a thermally insulated window is constructed using two or more panes of glass sealed at the edges, an air space is created between the panes of glass. This air space will contain air at ambient pressure. The air, of course, contains such components as nitrogen, oxygen and water vapor. In such a window, it is desirable to remove the water vapor from the air between the panes of glass, in order to prevent condensation of the water vapor on the glass.

For this use, the improved zeolite of the present invention may be used alone as a dessicant or it may be incorporated into the sealant material which is used at the edge of the window to seal between the panes of glass. When the zeolite is mixed with the other ingredients of the sealant material while the sealant is being manufactured, it becomes disposed within the matrix of the sealant material in such a manner as to be able to adequately function as an adsorbent for the air within the window. The air, of course, contacts the exposed surface of the sealant, and the water vapor is adsorbed from the air at that location.

FIG. 1 illustrates a composite structure A comprising a first member 10 and second member 12 having facing, generally parallel surfaces, spaced a finite distance from each other. The composite structure A also includes means for maintaining members 10, 12 in the spaced relationship and for effecting a seal between the facing surfaces thereof. Specifically, a sealant and spacer strip, designated generally as 14, maintains the members 10, 12 in spaced relationship and provides the seal.

Members 10, 12 as illustrated are formed of glass, and the composite structure A is a double glazed insulating glass window. However, it will be appreciated that the invention has applicability in the environment of an unrestricted variety of constructions and/or structural materials, including without limitation plastics and other materials.

The sealant and spacer strip 14 comprises an elongated ribbon 16 of deformable sealant, enveloping and having embedded therein a spacer means 18 which extend longitudinally of ribbon 16. The spacer means 18 is an undulating sheet of relatively rigid material which may conveniently be formed of aluminum. It will be noted that all of the surfaces and edges of the spacer means 18 are in intimate contact with ribbon 16 of sealant. Such a spacer strip is shown in U.S. Pat. No. 4,431,691. The sealant 16 includes the improved zeolite of the present invention.

There are many types of sealants usable in such windows, and many ways of preparing such sealants. Examples may be found in U.S. Pat. Nos. 3,791,910 and 3,832,254.

A typical range of ingredients for a sealant is as follows:

400 to 600 parts butyl;
150 to 350 parts hydrocarbon resin;
10 to 15 parts zinc oxide;
100 parts carbon black;
100 parts aromatic resin; and
5 to 6 parts silane.

The fluid used in forming the slurry of zeolite and fluid, as described above, is also an ingredient of the sealant formulation, and functions as a plasticizer. The amount of zeolite/fluid slurry used in the sealant may vary depending on how much adsorbent capability is needed and on how much fluid is needed in the sealant.

The slurry of coated zeolite, in the amounts and prepared as described above, is combined with the sealant ingredients in a sigma blade mixer for one hour and fifteen minutes. The temperature of the mix rises to 260° F. as a result of internal friction. A vacuum of 25 inches of mercury is applied during the last 20 minutes of the mixing process. Slugs of the resulting material are made, and are extruded into sealant strips, incorporating an aluminum swiggle strip as described in U.S. Pat. No. 4,431,691. The sealant material in strip form is then coiled and sealed in cans.

Test samples of this sealant which incorporates the improved zeolite adsorbent, and of a standard sealant, were pressed between glass and aluminum prior to conditioning at 135° F. and 100% relative humidity for 24 hours. The sample of the standard sealant outgassed, forming bubbles at the interface between the glass and the sealant. The sealant of the present invention did not outgas or form any bubbles, and there was no loss of adhesion between the glass and the sealant.

It can be seen from the foregoing that the present invention provides an improved zeolite adsorbent having the desirable characteristics of (a) a lack of gases such as nitrogen and oxygen, so as to minimize outgassing and re-adsorption of gases during periods of temperature or pressure fluctuation; (b) a lower capability to adsorb gases such as nitrogen and oxygen from air such as the air space in a double-paned glass window because the pore apertures of the zeolite are covered with a layer of fluid which is essentially impermeable to oxygen and nitrogen; and (c) an ability to slowly adsorb water vapor from the surrounding air and retain it in the pores of the zeolite, thus reducing condensation on the inner surfaces of the panes of glass in a double-paned glass window.

As used herein, term "outgas" or "outgassed" refers to zeolite which has been heated to drive out gases and water vapor from the pores of the zeolite.

What is claimed is:

1. An adsorbent useful in sealants for the fabrication of multiple glazed windows consisting essentially of outgassed zeolite having pores with apertures large enough to permit passage of oxygen and nitrogen into the pore spaces and a layer of an organic compound extending over said pore apertures, said organic compound being essentially impermeable to oxygen and nitrogen and relatively permeable to water vapor.

2. An adsorbent comprising (i) a zeolite having a surface and having a plurality of pores extending through said surface into said zeolite, said pores having apertures large enough to permit passage of oxygen and nitrogen molecules through said pore aperatures, and (ii) a fluid disposed on said surface of said zeolite and extending over and covering said pore apertures, said fluid being essentially impermeable to nitrogen and oxygen molecules and relatively permeable to water vapor; wherein said fluid is selected from the group consisting of paraffinic oil, naphthenic oil, and aromatic oil.

3. An adsorbent as defined in claim 2 wherein the zeolite material is a mixture of at least two zeolite materials having different pore aperture sizes.

4. An adsorbent as defined in claim 3 wherein the zeolite is a mixture of a zeolite material having a pore aperture diameter of 4 angstroms with a zeolite material having a greater pore aperture diameter up to and including 10 angstroms.

5. An adsorbent as defined in one of claims 2, 3 or 4, wherein said fluid is a paraffinic oil.

6. A sealant for multiple glazed windows having a zeolite adsorbent therein, wherein said zeolite adsorbent, having pores with apertures large enough to permit passage of oxygen and nitrogen into the pore spaces, is treated with a paraffinic, naphthenic or aromatic oil or mixtures thereof under heat or under heat and vacuum to render the zeolite permeable to water vapor and essentially impermeable to oxygen and nitrogen.

7. A sealant as defined in claim 6 in the form of a slurry further comprising butyl, resin, zinc oxide, carbon black, aromatic resin and silane.

8. A sealant as defined in one of claim 6 or 7 wherein said zeolite is treated with a paraffinic oil.

9. A sealant as defined in one of claims 7 or 8 wherein the zeolite material is a mixture of a zeolite having a pore aperture diameter of 4 angstroms with one or more zeolites having a pore aperture diameter greater than 4 angstroms and up to and including 10 angstroms.

10. A sealant for multiple glazed windows having an adsorbent comprising (i) an outgassed zeolite having a surface and have a plurality of pores extending through said surface into said zeolite, said pores having apertures large enough to permit passage of oxygen and nitrogen molecules through said pore apertures, and (ii) a fluid disposed on said surface of said zeolite and extending over and covering said pore apertures, said fluid being essentially impermeable to nitrogen and oxygen molecules and relatively permeable to water vapor; wherein said fluid is selected from the group consisting of paraffinic oil, naphthenic oil, and aromatic oil.

11. A method of making a zeolite adsorbent that is permeable to water vapor and essentially impermeable to oxygen and nitrogen comprising the steps of:

providing a particulate material consisting essentially of zeolite having pores with apertures large enough to admit oxygen and nitrogen molecules into the pores;

providing a fluid which is essentially impermeable to oxygen and nitrogen and which is relatively permeable to water vapor, said fluid being selected from the group consisting of a paraffinic oil, a naphthenic oil and an aromatic oil;

mixing the zeolite material and the fluid to form a slurry of the zeolite and the fluid;

heating the slurry to a temperature sufficient to substantially drive off nitrogen and oxygen from the zeolite; and cooling the slurry to room temperature.

12. The method of claim 13 wherein vacuum is applied while heating the slurry.

13. The method as defined in one of claims 11 or 12 wherein said fluid 15 is paraffinic oil.

14. The method as defined in one of claims 11, 12 or 13 further comprising the steps of:

mixing the cooled slurry with butyl, hydrocarbon resin, zinc oxide, carbon black, aromatic resin, and silane;

heating the mixture at least partially under vacuum;

cooling the mixture; and forming the mixture into strips suitable for use as a sealant material for multiple glazed windows.

15. A sealant strip for multiple glazed windows prepared according to the method of claim 14.

* * * * *